United States Patent Office 2,911,380
Patented Nov. 3, 1959

2,911,380

POLY-(AROMATIC ETHER) COMPOSITIONS AND METHOD OF MAKING SAME

James D. Doedens, Midland, Mich., assignor to The Dow Chemical Company, Midland, Mich., a corporation of Delaware No Drawing. Application August 26, 1955
Serial No. 530,891

9 Claims. (Cl. 260—2.5)

This invention concerns certain new organic compositions, comprising condensation products (hereinafter termed "polymers") derived from halomethylated aromatic ethers, and a method of making the same. It pertains especially to solid, foamed bodies of such polymers and a method of making them. It is concerned more particularly with solid condensation polymers of halomethylated diphenyl oxide, especially in the form of solid foam bodies.

The invention provides poly-(aromatic ether) compositions which vary from being solid thermoplastic bodies, or resins, capable of being extruded or molded at elevated temperatures and pressures, to being solid rigid bodies that are insoluble in most solvents, are not capable of being molded at below the decomposition temperatures thereof, and apparently are thermoset resins. In some instances, the compositions of the invention comprise mixtures of thermoplastic and thermoset condensation-polymer ingredients. The condensation polymers which are prepared from halomethylated aromatic ethers containing an average of more than one halomethyl group per molecule usually retain unconsumed halomethyl radicals that are chemically reactive and can be utilized in making derivatives of the polymers. All of the poly-(aromatic ether) compositions of the invention can be produced in the form of solid articles of desired sizes and shapes. The poly-(aromatic ether) compositions which are in the forms of solid foam bodies can be produced directly, e.g. in molds, as articles of desired sizes and shapes, or can be cut or sawed to form such articles. The foam bodies are of low density, possess good heat-insulating properties, and can be used as heat-insulating materials, water-flotation bodies, etc.

The poly-(aromatic ether) compositions of the invention are prepared from corresponding halomethylated di-aromatic ethers such as mono- or poly-halomethylated diphenyl oxide, ditolyl oxide, or bis-(biphenyl) oxide, etc. Except for p-chloromethyl diphenyl oxide and p,p'-bis-chloromethyl diphenyl oxide, the respective preparations of which are described in German Patent 569,570 and by Tomita et al. in J. Pharm. Soc. Jap. 70, 44 (1950), the halomethylated aromatic ethers employed as starting materials in making the poly-(aromatic ether) compositions of the invention are, of themselves, new compounds. They can be made by reacting a halomethylating agent, such as methyl chloromethyl ether, bis-chloromethyl ether, or a mixture of formaldehyde and hydrogen chloride, with a di-aromatic ether such as diphenyl oxide or ditolyl oxide, etc., in the presence of a catalyst for the reaction, such as zinc chloride, aluminum chloride, ferric chloride, or boron trifluoride, etc. Procedures for carrying out halomethylation reactions are well known in the art and can be applied in halomethylating di-aromatic ethers, such as those mentioned above, to obtain halomethylated diaryl ethers suitable for use as starting materials in the process of the invention. Mono- or poly-halomethylated di-aromatic ethers, or mixtures thereof, may be prepared depending on the proportion of halomethylating agent employed, the extent of the halomethylation reaction and on whether steps are taken to separate and purify an individual halomethylated aromatic ether product.

Examples of halomethylated di-aromatic ethers that can be prepared as just described and be employed as starting materials in the process of the invention are mono-(chloromethyl) diphenyl oxide, di-(chloromethyl) diphenyl oxide, tri-(chloromethyl) diphenyl oxide, tetra-(chloromethyl) diphenyl oxide, mono-(bromomethyl) diphenyl oxide, di-(bromomethyl) diphenyl oxide, mono-(chloromethyl) ditolyl oxide, di-(chloromethyl) ditolyl oxide, mono-(bromomethyl) ditolyl oxide, etc. Any of these halomethylated di-aromatic ethers can be used individually or in mixture with one another as starting materials in making the poly-(aromatic ether) compositions of the invention.

The invention is based on a discovery that mono- or poly-halomethylated di-aromatic ethers, such as those just mentioned, can be heated to cause a splitting out of hydrogen halide between molecules of the starting material and resultant formation of a condensation polymer containing a plurality of di-aromatic ether groups in the molecule. In instances in which the halomethylated aromatic ether starting material contains an average of more than one halomethyl group per molecule, the polymer product usually retains unreacted halomethylated groups in its molecule. Together with the halomethylated di-aromatic ether reactant there may be employed a non-halomethylated aromatic starting material such as a non-halogenated di-aromatic ether, benzene, toluene, or biphenyl, etc., in which case at least a portion of the non-halomethylated aromatic starting material usually enters into the condensation reaction and becomes chemically bonded in the resin product.

The mechanism of the reactions involved in making the poly-(aromatic ether) compositions and the molecular structures of the condensation polymer ingredients of the compositions have not definitely been established. However, the following equations are illustrative of the general types of reactions involved in making such resins from halomethylated diphenyl oxides or from mixtures thereof with diphenyl oxide itself.

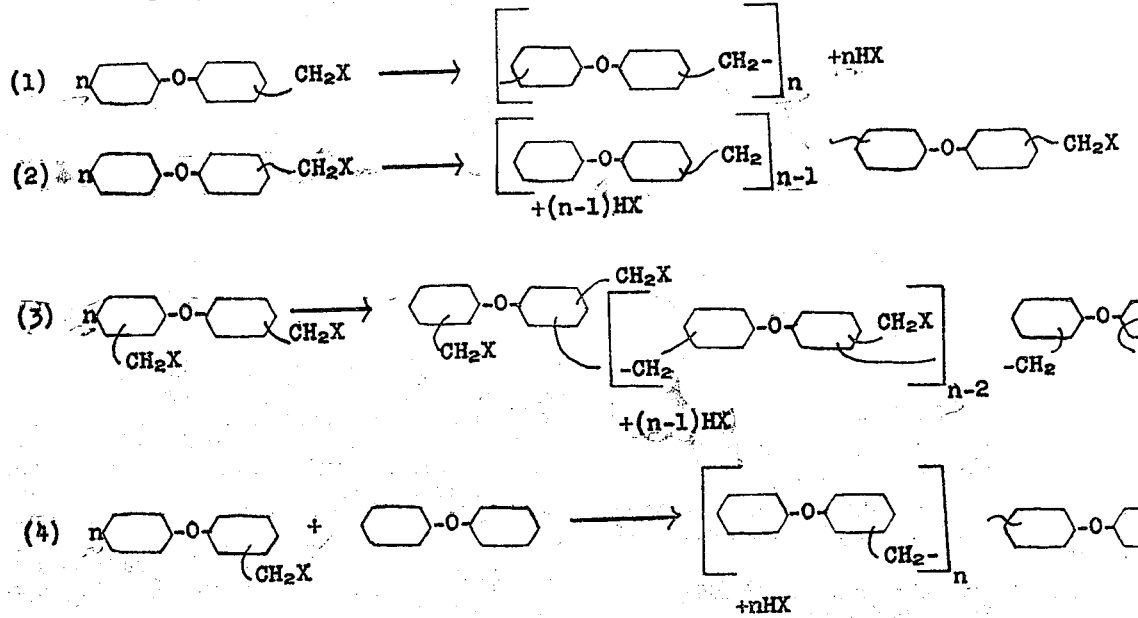

In the equations just given, $n$ represents a whole number greater than 1, and usually greater than 3, and X represents chlorine or bromine. The resin products may possess molecular structures other than those indicated in the above equations, e.g. they may possess linear, cyclic, branched, or cross-linked molecular structures. They often have properties indicating that they comprise mixtures of polymers possessing two or more of the kinds of molecular structures just mentioned. The products usually comprise mixtures of polymer molecules of different molecular weights.

It has further been found that although the condensation reactions to form the polymers can be accomplished by heating the halomethylated aromatic ethers in the absence of catalysts, Friedel-Crafts catalysts, even when present in very small proportions and/or in a form deactivated by contact with water or with aqueous solutions of acids, bases, or salts, are highly effective in catalyzing the condensation reaction and in causing a lowering of the temperature at which it can be accomplished at a satisfactory rate. Examples of suitable catalysts for the resin-forming condensation reaction are aluminum chloride, iron chloride, and zinc chloride, etc. Similar catalysts are usually employed in reacting halomethylating agents with di-aromatic ethers to form the halomethylated aromatic ether reactants and, even after washing the latter with water, the traces of metal halide which remain associated with the halomethylated ether are usually adequate to catalyze the condensation reaction for formation of a resin from the halomethylated ether.

It has further been found that the hydrogen halide formed in the condensation reaction often causes expansion of the reacting mixture with a result that the resin product is formed directly as a solid foam. In order to obtain such foam it is, of course, necessary that at least part of the hydrogen halide remain trapped as small gas bubbles throughout the reacting mixture during the stage in which the aromatic ether ingredients remain in liquid condition. The mono- and poly-halomethylated diphenyl oxides, when employed as the organic starting materials, do not permit ready escape of the hydrogen halide formed during the chemical condensation of the same to form solid resinous products, hence the latter are readily produced directly in the form of solid foams. Dichloromethylated o,o'-dimethyl-diphenyl oxide, i.e. dichloromethylated o,o'-ditolyl oxide, on the other hand permits ready escape of the hydrogen chloride formed when using it as the starting material, in the process, so that little if any expansion of the mixture occurs during the reaction to form a resin therefrom and the product is usually a substantially non-cellular, solid body. In instances in which the resin products are obtained as solid foams, the latter permit fairly rapid diffusion of gases such as the hydrogen halide or air therethrough and can be rendered substantially free of the hydrogen halide by applying a vacuum, or a gas pressure, preferably in a manner such as to displace the hydrogen halide with another gas, e.g. air.

It has still further been found that foaming of the reaction mixture can be prevented by initially adding to the mixture either an alkali or other hydrogen halide acceptor capable of combining chemically with the hydrogen halide to prevent accumulation of gas bubbles in the reacting mixture or an organic solvent or plasticizer effective in reducing the surface tension of the reaction mixture and thus facilitating escape of the hydrogen halide from the mixture. Examples of alkalies that can be added to prevent the foaming are alkali metal hydroxides and carbonates such as sodium hydroxide, potassium hydroxide, lithium hydroxide, sodium carbonate, and potassium carbonate, etc.

The reactions for production of the resins are accomplished merely by heating the aforementioned starting mixtures to temperatures at which a hydrogen halide is formed. In instances in which a metal halide is present, even in trace amount, as a catalyst for the reaction, the latter usually takes place at a fairly rapid rate upon heating the mixture at atmospheric pressure or thereabout to temperatures in the vicinity of 90 to 100° C. The reaction can be carried out at temperatures between those just mentioned and the decomposition temperatures of the resin products. It is usually carried out at temperatures in the range of from 90° to 400° C. and in most instances preferably at from 100° to 150° C. The reaction for formation of the resins is usually conducted at atmospheric pressure or thereabout, e.g. at pressures of from 0.5 to 1.5 atmospheres, but it can be accomplished at lower or higher pressures.

In practice of the method to make a solid resin foam, the reaction for making the resin can be carried out in a mold, having small perforations for escape of gas therefrom, so as to obtain the resin foam directly in the form of an article of desired size and shape.

The following examples described ways in which the invention has been practiced and illustrate certain of its advantages, but are not to be construed as limiting its scope.

*Example 1*

A mixture of mono-chloromethyl-diphenyloxide and 0.2 percent by weight of zinc chloride was heated at an absolute pressure of about 15 mm. of mercury. When the temperature had been raised to 83° C., hydrogen chloride was formed, and withdrawn by means of a pump, and the reaction mixture became viscous. External heating was then discontinued and the temperature of the mixture rose spontaneously to 101° C. The reaction was continued at about 100° C. until the evolution of hydrogen halide had substantially ceased. The product in the reaction vessel was then in the form of a red oil. It solidified when cooled to room temperature. It is a thermoplastic resin which softens sufficiently to permit molding of the same at temperatures in a range of from 60 to 100° C. When in a heat-plastified condition, the product can be drawn into hair-like filaments of from 8 to 10 feet in length.

*Example 2*

A solution of 0.24 molecular equivalent weight of zinc chloride in 2 molecular equivalent weights of chloromethyl methyl ether was heated to boiling under reflux at atmospheric pressure. One molecular equivalent weight of diphenyl oxide was added gradually to the solution. After completing the addition, boiling of the mixture was continued for 2 hours. The mixture was then cooled and washed with about an equal volume of water and the aqueous and organic layers of the resulting mixture were separated. Attempt was made to distill the organic layer, comprising the chloromethylated diphenyl oxide, under vacuum, but hydrogen chloride was evolved from the heated mixture and the latter solidified as a rigid cellular body. The solid product resembled wood in hardness, could be sawed or otherwise cut with wood-working tools, and was difficult to break, even under the force of a carpenter's hammer.

In later experiments, it was found that when the catalyst, e.g. zinc chloride, for the reaction of halomethylating diphenyl oxide is carefully removed as completely as possible from the reacted mixture prior to heating the latter, it is possible to distill the mono- and di-chloromethylated diphenyl oxide under vacuum to obtain each in a purified condition. It is evident, therefore, that the dehydrochlorination reaction to form the resin which took place during the above-described attempted distillation of chloromethylated diphenyl oxide was due to retention of at least a trace of zinc chloride in the water-washed chloromethylated diphenyl oxide.

*Example 3*

Bis-chloromethylated diphenyl oxide, presumably 4,4'-di-(chloromethyl) diphenyl oxide was prepared by procedure similar to that described in Example 2 except that the reaction mixture contained about 20 percent by weight of zinc chloride. The product was washed with water and then heated at atmospheric pressure. When the liquid starting material had been heated to from 98° to 100° C., hydrogen chloride was evolved and the mixture foamed and increased in viscosity. The reaction was continued at temperatures of from 105° to 150° C. until the evolution of hydrogen chloride was substantially complete. A solid resin foam was thereby formed. After standing in the air at atmospheric pressure for about 10 minutes the resin foam was free from the odor of hydrogen chloride, i.e. the latter escaped rapidly from the solid foam. A portion of the resin foam was analyzed. It was found to contain 12.5 weight percent of chemically combined chlorine and 0.02 percent of free hydrogen chloride. This is somewhat less than the theoretical value of 15.2 percent chlorine for a linear condensation polymer having the formula $$(ClCH_2C_6H_3OC_6H_4CH_2-)_n$$

wherein $n$ is the number of such groups in the molecule, and indicates that the product possesses a cross-linked molecular structure. Other portions of the resin foam product were tested and found to possess the following properties. The resin foam product chars slowly in an open gas flame, but does not support combustion. The product is insoluble in usual organic liquids such as benzene, toluene, chlorobenzene, petroleum ether, methanol, ethanol, ortho-dichlorobenzene and acetone. It is also insoluble at room temperature in aqueous sodium hydroxide solutions and in aqueous sulfuric acid solutions. These properties, also, indicate that the product possesses a cross-linked molecular structure.

*Example 4*

In separate experiments, mixtures of mono- and di-chloromethylated diphenyl oxides containing about 40 weight percent and about 60 weight percent of the monochloromethylated diphenyl oxide, respectively, were heated together with minor amounts of zinc oxide at atmospheric pressure to temperatures, in the order of from 100° to 150° C., at which hydrogen chloride was formed and evolved. In each experiment the mass foamed and increased in viscosity during the reaction and a solid resin foam was obtained. The resin foam products were infusible, would char in a flame but would not support combustion, were insoluble in organic liquids such as those mentioned in Example 3 and also in cold aqueous solutions of acids and of alkalies.

*Example 5*

A liquid mixture of 2 parts by weight of bis-(chloromethyl) diphenyl oxide, 1 part of diphenyl oxide and a catalytic amount of zinc chloride was heated to from 100° to 150° C. During the heating, hydrogen chloride was evolved and caused foaming of the mixture as it thickened to form a solid resin. The solid resin foam thus obtained is less brittle than, but otherwise similar in physical properties to, that obtained from bis-(chloromethyl) diphenyl oxide alone.

In another experiment a mixture of equal parts by weight of diphenyl oxide and bis-(chloromethyl) diphenyl oxide together with a catalytic amount of zinc oxide was heated to cause formation and evolution of hydrogen chloride therefrom. The resinous product resembled a gum rubber in physical properties.

*Example 6*

A eutectic mixture of diphenyl oxide and biphenyl was chloromethylated in the presence of zinc chloride by procedure similar to that described in Example 2. The reacted mixture was washed with water and thereafter heated at reaction temperatures of from 100° to 150° C. Hydrogen chloride was evolved and caused expansion of the mixture and a solid resin foam was formed. The resin foam was similar in physical properties to that obtained in Example 3 from bis-(chloromethyl) diphenyl oxide.

*Example 7*

A mixture of the ortho- and para-isomers of phenyl biphenyl ether was reacted with approximately twice its molecular equivalent of chloromethyl methyl ether in the presence of zinc oxide as catalyst. The procedure in carrying out the chloromethylation reaction was similar to that described in Example 2. The reacted mixture was washed with water and thereafter was heated at atmospheric pressure to reactions temperatures in the range of from 100° to 150° C. Hydrogen chloride which was thereby formed, caused expansion, i.e. foaming, of the reaction mixture. A brittle solid resin foam was obtained as the organic product.

*Example 8*

Ortho,ortho'-dimethyl-diphenyl oxide, i.e. 2,2'-ditolyl oxide, was reacted with approximately twice its molecular equivalent of chloromethyl methyl ether in the presence of zinc chloride as a catalyst and the reacted mixture was washed with water. The procedure in carrying out these operations was similar to that described in Example 2. The chloromethylated 2,2'-ditolyl oxide was heated at atmospheric pressure to about 130° C., whereupon hydrogen chloride was formed and evolved freely from the mixture without causing appreciable foaming. The residual mixture was converted by the reaction to an unfoamed solid body of a clear, amber, thermoplastic resin. The resin product is quite brittle and is insoluble in acetone. It is partially soluble in benzene and also in toluene. The resin chars in an open flame, but does not support combustion.

*Example 9*

The compound 4,4'-ditolyl oxide was chloromethylated in the presence of zinc chloride by procedure similar to that described in Example 2 to form a mixture of about equal parts by weight of mono- and di-chloromethylated ditolyl oxides. The catalyst was washed from the reacted mixture with water and the mixture was fractionally distilled under vacuum to separate the mono- and poly-chloromethylated products. The di-chloromethylated ditolyl oxide was obtained as a solid material melting at from 75° to 77° C., whereas the mono-chloromethylated ditolyl oxide was a liquid at room temperature. When either of these chloromethylated ditolyl oxides was heated at atmospheric pressure to 190°–200° C., hydrogen chloride was evolved and a clear, unfoamed thermoplastic resin which was brittle and of amber color was formed. The resins thus formed are soluble in benzene and also in toluene. They are insoluble in acetone, ethanol, and in an aqueous sodium hydroxide solution of 50 weight percent concentration.

*Example 10*

In each of two experiments a mixture of equimolecular amounts of bis-(chloromethyl) diphenyl oxide and an alkaline substance was heated to reaction temperatures of from 100° to 150° C., whereby a resin that is solid at room temperature was formed. The alkaline materials which were used in the respective experiments are sodium hydroxide and sodium carbonate. No foaming occurred in either experiment, i.e., the resin products were unfoamed solid bodies.

*Example 11*

This example demonstrates that the condensation reaction to form a poly-(aromatic ether) resin can be accomplished in the absence of catalysts. Bis-(chloromethyl) diphenyl oxide, which had been carefully purified to remove the catalyst employed in making the same, was heated in an open glass vessel at atmospheric pressure. An evolution of hydrogen chloride started at a temperature of about 165° C. Upon further heating of the mixture to 265° C. it expanded, due to the formation of hydrogen chloride therein, and increased rapidly in viscosity until it had thus been converted to a resin foam.

We claim:

1. Organic condensation products derived from nuclear halomethylated di-aromatic ethers of the benzene series, containing a halogen selected from the class consisting of chlorine and bromine in each halomethyl radical thereof, by a thermal intermolecular splitting of a corresponding hydrogen halide from an aromatic starting material which includes such a nuclear halomethylated diaromatic ether, which thermal reaction is accomplished by heating said starting material to a reaction temperature between 90° C. and the decomposition temperature of the organic condensation product.

2. A solid condensation product derived from a nuclear halomethylated di-aromatic ether, of the benzene series, containing a haolgen selected from the class consisting of chlorine and bromine in each halomethyl radical thereof, and containing an average of more than one halomethyl group per molecule, by a thermal intermolecular splitting at reaction temperatures between 90° and 400° C. of hydrogen halide therefrom, which solid condensation product retains unreacted halomethyl groups as substituents on aromatic nuclei thereof.

3. A solid foam body having cell walls composed essentially of a solid condensation product of a reactive aromatic starting material comprising a halomethylated organic compound, selected from the class consisting of halomethylated diphenyloxide and halomethylated phenyl biphenyl ether, which solid foam body is prepared by heating said starting material at reaction temperatures between 90° and 400° C. and thereby causing a condensation reaction involving an intermolecular splitting of a hydrogen halide from the starting material with resultant expansion of the mass into a foamed resinous body.

4. A solid condensation product derived from a mixture of diphenyl oxide and chloromethylated diphenyl oxide by a thermal intermolecular splitting at reaction temperatures between 90° and 400° C. of hydrogen chloride therefrom.

5. A solid condensation product derived from nuclear chloromethylated ditolyl oxide by an intermolecular splitting at reaction temperatures between 90° and 400° C. of hydrogen chloride therefrom.

6. A method which comprises heating a starting mixture comprising reactive aromatic material, including a major proportion by weight of at least one nuclear halomethylated di-aromatic ether, of the benzene series, containing a halogen selected from the class consisting of chlorine and bromine in each halomethyl radical thereof and a small proportion of a Friedel-Crafts catalyst to a reaction temperature between 90° and 400° C., whereby a corresponding hydrogen halide and a solid resin are formed.

7. A method, as claimed in claim 6, wherein the starting mixture comprises a major proportion by weight of chloromethylated diphenyl oxide containing an average of more than one chloromethyl group per molecule, and hydrogen chloride formed by the reaction causes expansion of the reaction mixture with a result that a solid resin foam is formed.

8. A method, as claimed in claim 6, wherein the starting mixture comprises a major proportion by weight of a nuclear chloromethylated ditolyl oxide.

9. A method which comprises heating a starting mixture comprising a reactive aromatic material, including a major proportion by weight of at least one nuclear halomethylated di-aromatic ether of the benzene series, containing a halogen selected from the class consisting of chlorine and bromine in each halomethyl radical thereof, to a reaction temperature between 90° C. and the decomposition temperature of the organic condensation product, whereby a hydrogen halide and a solid resin are formed.

References Cited in the file of this patent

UNITED STATES PATENTS 2,387,037   Otto et al. _____ Oct. 16, 1945

FOREIGN PATENTS 569,570   Germany _____ Feb. 4, 1933